United States Patent [19]

Lichtenberger et al.

[11] Patent Number: 4,801,947

[45] Date of Patent: Jan. 31, 1989

[54] ELECTRODEPOSITION-PRODUCED ORIFICE PLATE OF AMORPHOUS METAL

[75] Inventors: John A. Lichtenberger; Rodger L. Gamblin, both of Dayton, Ohio

[73] Assignee: Burlington Industries, Inc., Greensboro, N.C.

[21] Appl. No.: 66,174

[22] Filed: Jun. 25, 1987

[51] Int. Cl.[4] .......................... G01D 15/18; C25D 1/08; B32B 15/00

[52] U.S. Cl. .................................. 346/75; 346/140 R; 204/9; 204/14.1; 204/11; 204/15; 428/680

[58] Field of Search ................. 346/75, 140 R; 204/9, 204/11, 14.1, 15; 428/680

[56] References Cited

U.S. PATENT DOCUMENTS

| | | | |
|---|---|---|---|
| 2,198,267 | 4/1940 | Lind | 204/14 |
| 2,643,221 | 6/1953 | Brenner et al. | 204/431 |
| 4,148,973 | 4/1979 | Sexton et al. | 428/680 |
| 4,184,925 | 1/1980 | Kenworthy | 204/11 |
| 4,229,265 | 10/1980 | Kenworthy | 204/11 |
| 4,429,021 | 1/1984 | Higashi | 428/629 |
| 4,528,070 | 7/1985 | Gamblin | 204/11 |
| 4,528,577 | 7/1985 | Cloutier et al. | 346/140 R |
| 4,554,219 | 11/1985 | Gamblin | 428/667 |

FOREIGN PATENT DOCUMENTS

| | | | |
|---|---|---|---|
| 2348362 | 4/1975 | Fed. Rep. of Germany . | |
| 3504186 | 8/1985 | Fed. Rep. of Germany . | |
| 59-50190 | 3/1984 | Japan | 204/44.7 |
| WO86/07100 | 12/1986 | PCT Int'l Appl. . | |

OTHER PUBLICATIONS

Yamasaki et al., "The Microstructure and Fatigue Properties of Electroless Deposited Ni-P Alloys", Scripta Metallurgica, vol. 15, pp. 177-180 (1981).

ASTM Publication B490, "Standard Practices for Micrometer Bend Test for Micrometer Bend Test for Ductility of Electrodeposits", pp. 327-328 (1980).

Patent Abstracts of Japan, vol. 4, No. 65, May 16, 1980 (Kokai No. 55-31181).

Patent Abstracts of Japan, vol. 10, No. 43, Feb. 20, 1986 (Kokai No. 60-190588).

*Primary Examiner*—E. A. Goldberg
*Assistant Examiner*—Gerald E. Preston
*Attorney, Agent, or Firm*—Nixon & Vanderhye

[57] ABSTRACT

Process and apparatus for electrodepositing a metallic layer (such as, an amorphous nickel-phosphorus alloy) onto a surface of a substrate includes forming the substrate into a cylindrical configuration and immersing it in a liquid electrodeposition bath containing the metallic substance to be deposited onto the substrate surface. During the electrodeposition of the metallic substance onto the substrate surface, the substrate is rotated within the bath so as to expose the substrate surface uniformly to the bath liquid and to the electric field which, on average, is substantially constant. The process finds particular utility in the production of orifice plates for use in fluid jet printing devices.

7 Claims, 2 Drawing Sheets

ELECTRODEPOSITION-PRODUCED ORIFICE PLATE OF AMORPHOUS METAL

FIELD OF THE INVENTION

The present invention relates generally to electrodeposition of metallic substances onto a surface of a substrate. More particularly, the present invention relates to apparatus and process whereby monolithic (i.e. self-supporting) foils, layers or plates of a metallic substance can be readily and uniformly produced. The apparatus and process of this invention find particular utility in the production of orifice "plates" utilized in fluid jet or liquid jet printing devices. Thus, although reference will be made hereinafter to fluid jet printing devices and to orifice plates used therein, such a reference is merely exemplary of a preferred embodiment and utility for the present invention.

BACKGROUND AND SUMMARY OF THE INVENTION

It is known that metals, including metal alloys (either crystalline or amorphous), may be electrodeposited upon a surface of a substrate so as to form a plating, coating or layer of the metal thereon. In recent years, electrodeposition processing has been utilized so as to produce orifice plates suitable for use in fluid jet printing devices, as is disclosed in U.S. Pat. Nos. 4,229,265 and 4,528,070. Electrodeposition of metals to form orifice plates is a desirable technique since it is critically important that the apertures of the orifice plate be formed within very close spatial and alignment tolerances. Otherwise, fluid droplet streams which issue from misformed or misaligned apertures are skewed relative to other droplet streams, thereby degrading the resulting print quality. Electrodeposition techniques, to a large extent, ensure that such close spatial and alignment tolerances are observed when used to produce orifice plates for fluid jet printing devices.

By means of the present invention, process and apparatus have been provided whereby a layer of a metallic substance may be electrodeposited upon a surface of a substrate, the deposited layer then preferably being separated from the substrate so as to form a monolithic (i.e. self-supporting) "foil" of the deposited metal. The substrate onto which the metal is to be electrodeposited is, according to this invention, formed into a cylindrical configuration and is immersed in a liquid electrodeposition bath containing ions of the metallic substance to be electrodeposited onto the substrate's exposed surface. The substrate, acting as a cathode, is then rotated in the bath about the axis of its cylindrical configuration while the electrodeposition process is occurring so as to expose the substrate surface to a substantially uniform electric field and to expose all of the substrate surface to the liquid in the bath. In such a manner, a layer having a uniform thickness (usually a few mils) of the metallic substance may be formed onto the substrate surface, the deposited layer being subsequently separated from the substrate so as to provide a self-supporting foil of the desired metal.

This invention may therefore be utilized to produce orifice plates suitable for use in fluid jet printing devices by masking an array of circular areas on the substrate's plating surface by well known photoresist techniques so as to prevent electrodeposition of the metal thereat. Upon separation of the deposited metal layer (to obtain a "foil" or "plate" of the deposited metal) from the substrate, apertures corresponding to the masked areas of the substrate's surface will be present in the removed metal layer. The present invention is therefore advantageously utilized so as to form "monolithic" orifice plates, that is to say, an orifice plate which is self-supporting (i.e. does not depend upon an underlying substrate for its mechanical support).

Since the foil will be self-supporting, there must be sufficient thickness to provide the necessary inherent mechanical support. Preferably, the orifice plates which can be produced by this invention have thicknesses of greater than 1.0 mil., and more preferably, not greater than about 2.5 mils. Of course, other thicknesses of the resulting foil are possible in dependance upon the duration of the electrodeposition process.

The metal to be deposited upon the substrate in accordance with this invention is preferably a ductile amorphous nickel-phosphorus alloy of the type disclosed in copending, commonly owned U.S. application Ser. No. 923,270 filed Oct. 27, 1986 in the name of John A. Lichtenberger (the entire disclosure thereof being expressly incorporated hereinto by reference). Such amorphous nickel-phosphorus alloys exhibit advantageous ductility which facilitates the alloy's separation from the underlying substrate and further handling of the resulting foil without being damaged.

Further advantages and details of this invention will become more clear after consideration is given to the detailed description of the invention which follows.

BRIEF DESCRIPTION OF THE DRAWINGS

Reference will hereinafter be made to the accompanying drawings wherein like reference numerals throughout the various Figures denote like structural elements, and wherein.

DETAILED DESCRIPTION OF THE INVENTION

Figure 1:
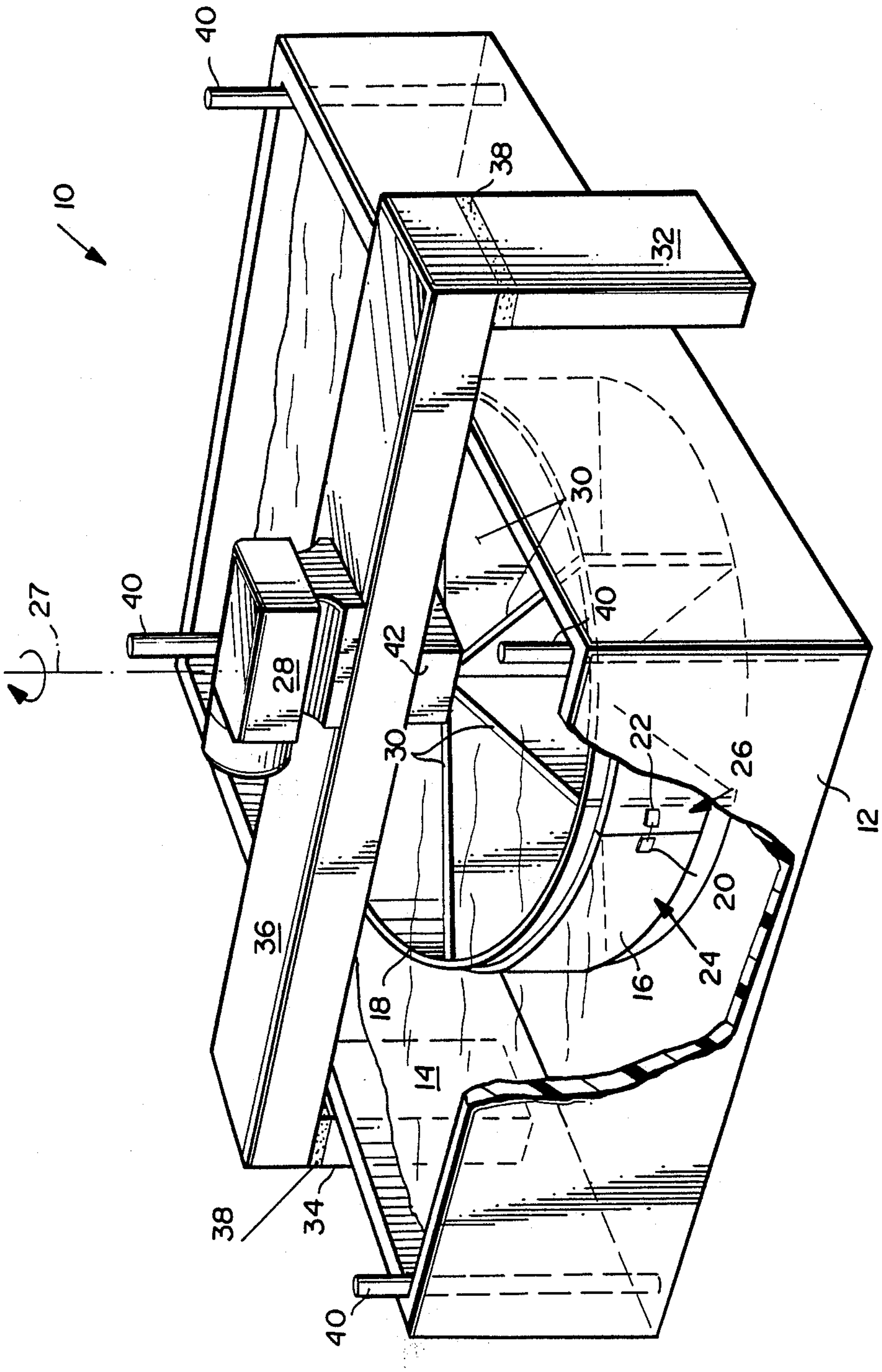
FIG. 1 is a schematic perspective view of an electrodeposition apparatus in accordance with this invention.

The electrodeposition apparatus of the invention is shown in greater detail in accompanying FIG. 1. As is seen, the apparatus 10 includes a walled tank 12 having an open top for containing the deposition bath liquid 14. The composition of bath 14 preferably comprises about 0.5–1.0 molar nickel (as metal, e.g. from nickel chloride), about 1.5–3.0 molar phosphorous acid, and about 0.0–0.6 molar hydrochloric acid (preferably some HCl, e.g. a substantial amount, i.e. 0.1M or greater).

A thin, elongate metal (e.g. stainless steel) substrate 16 is attached to an electrically conductive metal wheel 18 by means of clamp structures 20, 22 on each end 24, 26, respectively, of substrate 16. In such a manner, the substrate 16 is caused to assume a generally cylindrical configuration corresponding to the perimeter of wheel 18. The wheel 18 is connected to a central shaft (not shown, but which establishes an axis 27) of motor 28 via rigid, electrically conductive vanes 30 so that the motor 28 is capable of rotating the wheel 18 within tank 12 about axis 27.

A bridge member having a pair of upright supports 32, 34 (located on the exterior of the tank 12) and a cross support 36 (extending above and across the open top of tank 12) dependently support the wheel 18, and thus the substrate 16, within the tank 12 so that the wheel/substrate 18/16 assembly is immersed in the liquid bath 14. The opposing ends of the cross support 36 are connected to (and thus supported by) upright supports 32, 34. An insulating layer 38 is disposed between the upper ends of supports 32, 34 and cross support 36 so as to electrically isolate the latter structure. Anodes 40 are preferably disposed in each corner of tank 12, the wheel 18 being interconnected to the anodes 40 through a power source (not shown) via a mercury contactor 42, or like means. The substrate 16 attached to the wheel's 18 peripheral surface, thereby serves as the cathode in the electrodeposition process.

The substrate 16 is initially prepared for plating according to well known photoresist techniques (when, for example, it is desired to form an orifice plate for use in a fluid jet printing device). That is, the substrate is initially coated in a known manner with a photoresist material. The layer of photoresist material is then exposed through a suitable mask (i.e. a patterned glass plate) so as to develop the photoresist into the desired aperture array. Undeveloped photoresist may then be washed off the substrate's surface thereby leaving the exposed photoresist in the form of generally circular "pegs", each peg corresponding to an individual aperture of the yet to be formed orifice plate. The pegs prevent the metallic substance from being plated, during the electrodeposition process, upon that portion of the substrate's surface occupied by the pegs (and any other surface portion occupied by developed photoresist remaining on the substrate).

It is also desirable when practicing the present invention for the boundaries of the orifice plate to be defined on the substrate by developed photoresist since the deposited metal will be removed from the substrate. Such a practice eliminates the need to cut or size the resulting orifice plate after it has been separated from the substrate. The orifice plate's boundaries may thus be easily patterned onto the mask so that, when developed, the photoresist will define the same.

During plating of the metal from bath 14 onto the substrate 16, the motor 28 will cause the wheel 18, and thus the substrate 16, to rotate submerged within the liquid bath 14. Rotation of substrate 16 via wheel 18 thereby uniformly exposes the surface of the former to the bath liquid 14. Rotation of the substrate 16 also exposes its surface to an electric field which is, on average over time, very uniform over the entire surface of the substrate. Thus, by means of the present invention, electrodeposition of a uniform metallic layer onto the substrate's surface is more readily achieved.

When the electrodeposition process has proceeded for a time sufficient to plate a desired thickness of metal onto the substrate surface, the motor 28 is stopped and the conductive metal wheel 18 is hoisted from the tank, for example, by disassembling cross support 36 and upright supports 32, 34. The substrate 16 having the deposited metal thereon can then be removed from the peripheral surface of wheel 18 by disconnecting clamps 20 and 22. The deposited metal in the form of a self-supporting foil can then be mechanically separated from the substrate or, alternatively, the substrate and the foil layer can remain as an integral unit, depending upon the desired end use.

When the deposited metal layer is to be separated from the substrate in the form of a self-supporting foil, it is preferred that the surface of the substrate onto which the metal is to be deposited be pre-treated according to an adhesion-negating technique, such as by exposing the substrate's surface to a mild oxidizing acid, such as nitric acid, or by exposure to other, like passivating agents.

Figure 2:
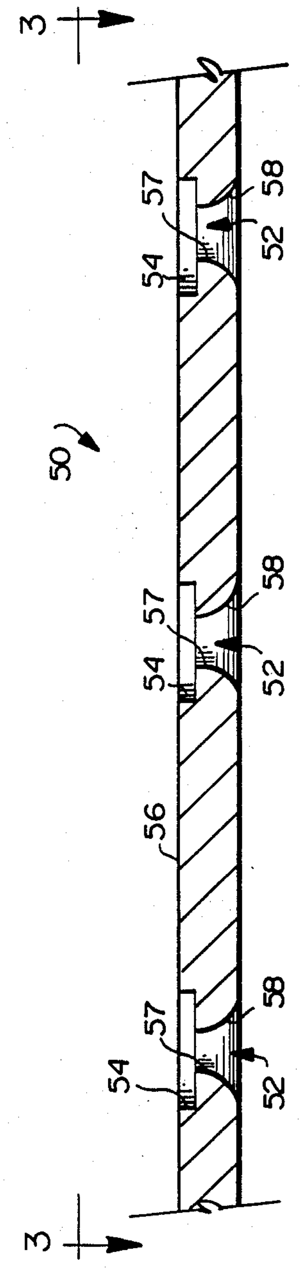
FIG. 2 is a partial, enlarged sectional view of an orifice plate made in accordance with the present invention.
Figure 3:
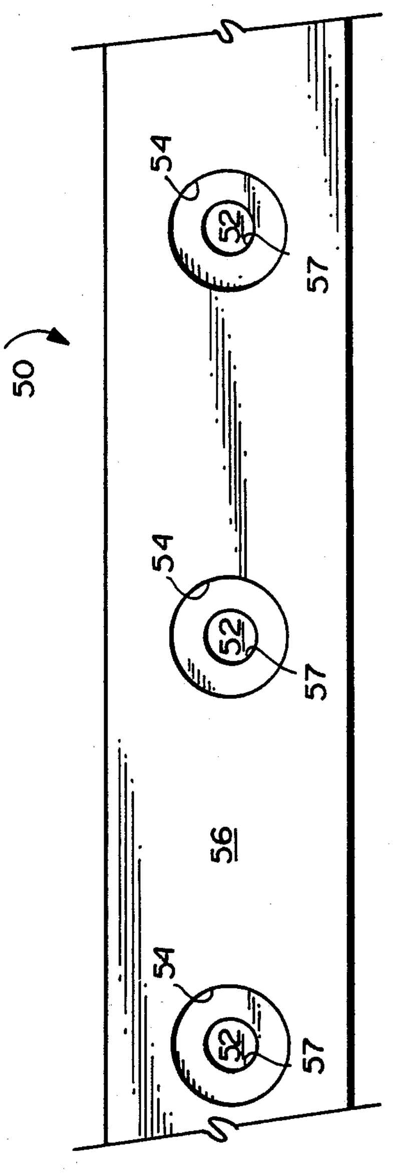
FIG. 3 is an enlarged, plan view of the orifice plate of FIG. 2 taken along line 3-3 therein.

FIGS. 2 and 3 respectively show sectional and plan views (each being greatly enlarged for clarity of presentation) of an orifice plate 50 using the plating technique described above. The plate 50 (which is the self-supporting plating layer removed from substrate 16) defines plural orifices 52 arranged in a predetermined array (for example, a linear array spaced along the length of plate 50 as is shown in FIGS. 2 and 3) corresponding to the pattern on the mask through which the photoresist is exposed. The photoresist, when developed, forms generally cylindrical pegs complementary to cylindrical recesses 54 formed in plating surface 56. (As is apparent, surface 56 of plate 50 was located next to the substrate 16 during the electrodeposition process.)

As the plating progresses, the plating material "grows" over the top of the pegs forming a generally cylindrical region 57 and a convexly curved rim 58. Cylindrical region 57 and rim 58 are continuous with one another, with the cylindrical region, in fact, being the termination of the curved rim 58. It is believed that the convexly curved rim 58 of the orifices 50, when used as the exit side for fluid droplet stream formation in a fluid jet printing device, assists in ejecting each droplet stream in parallel relationship (i.e. straight) to other droplet streams thereby promoting high quality in the resultant printing.

The resulting diameters of orifices 52 will be less as compared to the diameters of recesses 54 and are determined by the amount of plating, generally according to the formula:

$$D_{hole}=D_{peg}-2(T_{plate}-T_{peg})$$

where:

$D_{hole}$ is the diameter of the orifice;
$D_{peg}$ is the diameter of the photoresist peg remaining on the plating surface of the substrate;
$T_{plate}$ is the thickness of the plating; and
$T_{peg}$ is the thickness of the photoresist peg.

The diameter of the orifice ($D_{hole}$ in the above equation) is that diameter of cylindrical portion 57 in FIGS. 2 and 3. Properly formed orifices 52 (when used as a means to generate fluid droplet streams in a fluid jet printing device) should have a ratio of the diameter of cylindrical portion 57 to its length (i.e. as measured longitudinally of cylindrical portion 57 between the intersection at its upper end with recess 54 and its lower end with lip 58) of at least 4:1. Thus, it is desirable to have the cylindrical portion 57 as short as possible while having sufficient mechanical strength. The plate 50 is generally of a thickness of from about 1.0 up to about 2.5 mils, which is greater than the peg thickness. Accordingly, in order to assure highly uniform hole sizes, highly uniform plating rates are necessary, such as those provided by the present invention in which the electric field exposure of the metal (e.g., stainless steel) substrate is made, on average, highly uniform, due to the rotation of the substrate (acing as a cathode) past the anodes during the electrodeposition process. The techniques of this invention therefore enable greater control to be exercised in achieving the desired diameter/length ratio of cylindrical portions 57 formed in plate 50 for a given plating operation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. An orifice plate for fluid jet applications comprising a single layer of an amorphous metal alloy having a thickness of not greater than about 2.5 mils and defining a number of orifices through said single layer thickness, which orifices are arranged in a predetermined array along a length dimension of said plate, and in which first recessed portions are aligned with respective ones of the defined orifices therein and of greater diameter than the said respective orifice, said orifice plate being unsupported along its said length dimension between adjacent ones of said defined orifices.

2. An orifice plate as claimed in claim 1, wherein the recessed portion is cylindrical and has a depth, and wherein the orifice diameter is about equal to the diameter of the recessed portion less twice the difference between the thickness of the orifice plate and the depth of the recess.

3. An orifice plate as claimed in claim 1, wherein the orifice has a second, rounded recessed portion opposite from the first recessed portion.

4. An orifice plate for a fluid jet printing device, said plate comprising a unitary metal layer consisting essentially of a ductile amorphous nickel-phosphorus alloy having a multiplicity of orifices defined therein and arranged in a predetermined array along the length of said plate, said orifices including a first portion recessed in said unitary layer and a generally cylindrical portion joined at its one end to said first portion, said cylindrical portion having a lesser diameter as compared to the diameter of said first recessed portion, and wherein said plate is unsupported along its said length dimension between adjacent ones of said defined orifices.

5. An orifice plate as in claim 4, wherein the other end of said cylindrical portion terminates with a convexly curved surface.

6. An orifice plate for use in a fluid jet apparatus comprising a single layer of an amorphous nickel-phosphorus alloy defining a number of orifices along its length dimension, said single layer having substantially planar opposing surfaces which establish therebetweeen a thickness dimension of said orifice plate with the orifices thereof extending through said thickness dimension and opening onto each of said opposing substantially planar surfaces, and wherein said orifice plate is unsupported along said length dimension.

7. An orifice plate for use in a fluid jet apparatus comprising a single layer of an amorphous metal having opposing substantially planar surfaces which establish therebetween a thickness dimension $T_p$, and a number of orifices having a diameter $D_o$ defined in said plate and distributed along a length dimension thereof, said orifices being defined by a generally cylindrical portion joined to said orifice, said cylindrical portion having a diameter $D_c$ and a length dimension $L_c$, said diameter $D_c$ being greater than the diameter $D_o$, and wherein a ratio of $D_c$ to $L_c$ is at least 4:1.

* * * * *